Oct. 24, 1967   R. A. HYMAN ET AL   3,349,326
ELECTROLYTIC CURRENT INTEGRATOR
Filed March 12, 1963

Inventors
ROBERT A. HYMAN
CYRIL F. DRAKE
By
Attorney

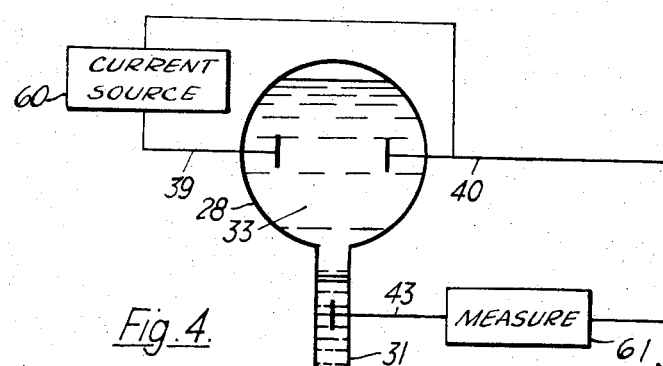
Fig.4.
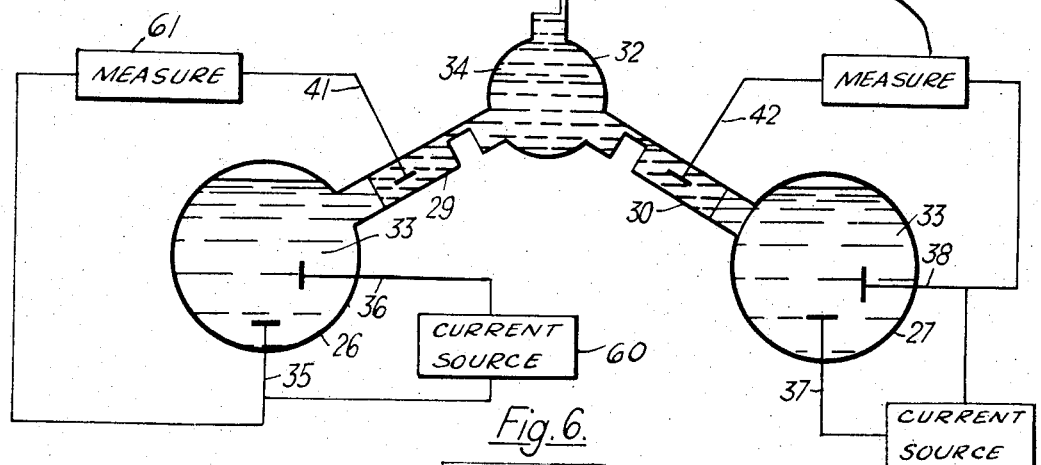
Fig.6.
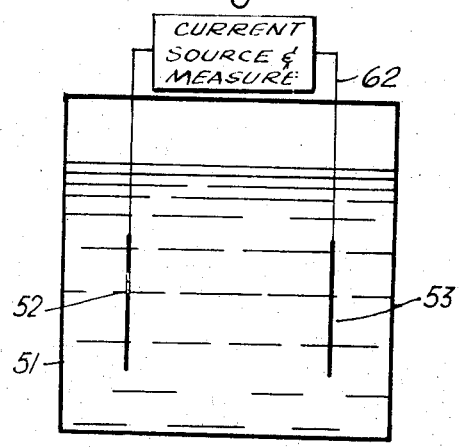
Inventors
ROBERT A. HYMAN
CYRIL F. DRAKE
By
Attorney United States Patent Office 3,349,326
Patented Oct. 24, 1967

3,349,326
ELECTROLYTIC CURRENT INTEGRATOR
Robert A. Hyman and Cyril Francis Drake, London, England, assignors to International Standard Electric Corporation, New York, N.Y., a corporation of Delaware
Filed Mar. 12, 1963, Ser. No. 270,130
9 Claims. (Cl. 324—94)

This invention relates to apparatus for digital to analogue conversion, examples of such apparatus being storage units for computers in which digital data is converted into analogue values and simultaneously stored and then or subsequently used for computation. It will be evident that such individual units may be part of larger systems, and may be so arranged that the organisation of the larger computational system is changed by the stored information in such a unit. By organisational change we mean a change in the arrangement of the conducting paths between units. This change may be continuous, in which case initially all the output from unit A is transferred to unit B, but as more information is added to A the increasing proportion of the output from A is channelled to unit C; or it may be discontinuous in which case unit A transfers its output to B or C.

The term "electrolytic cell" as used in this specification and in the claims appended thereto is defined as "a unit apparatus designed for carrying out an electrochemical reaction. It includes a vessel, two or more electrodes, and one or more electrolytes." (American Institute of Electrical Engineers.)

According to the invention there is provided apparatus for digital to analogue conversion comprising an electrolytic cell, as hereinbefore defined, having two or more electrodes, means for applying incremental quantities of electric current to the electrolyte and means for measuring the extent of the resultant electrochemical reaction within the electrolytic cell.

According to the invention there is also provided apparatus for digital to analogue conversion comprising an electrolytic cell as hereinbefore defined having three or more electrodes, means for applying incremental quantities, of electric current between two of the electrodes, and means for measuring between the third electrode and one other electrode a circuit parameter the value of which is representative of the extent of the electro-chemical reaction within the electrolytic cell.

Figure 1:
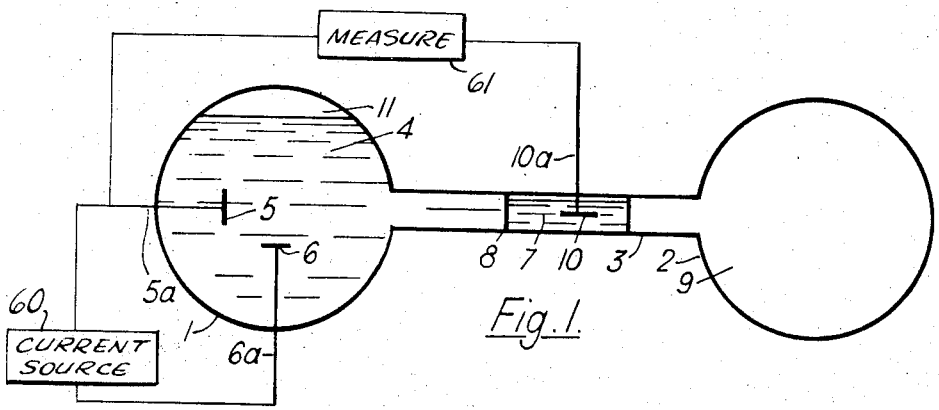
Figure 3:
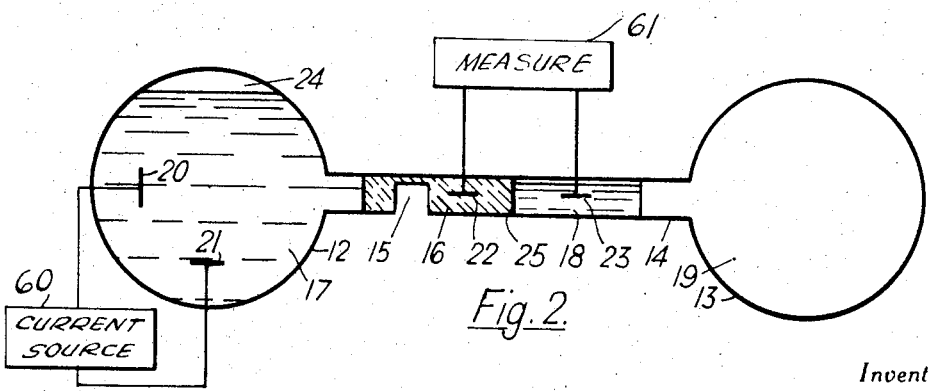
Figure 2:
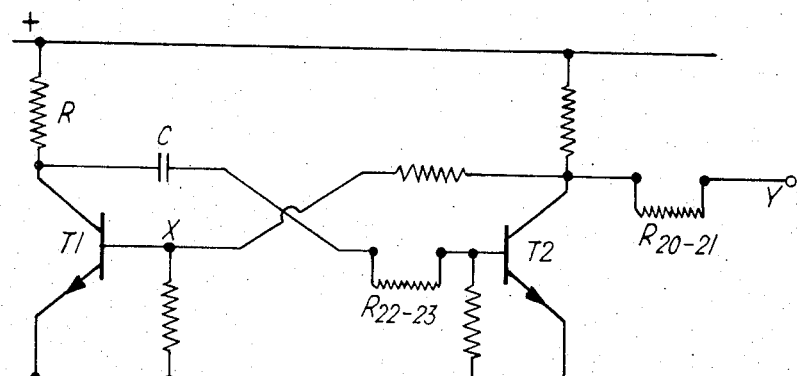
Figure 5:
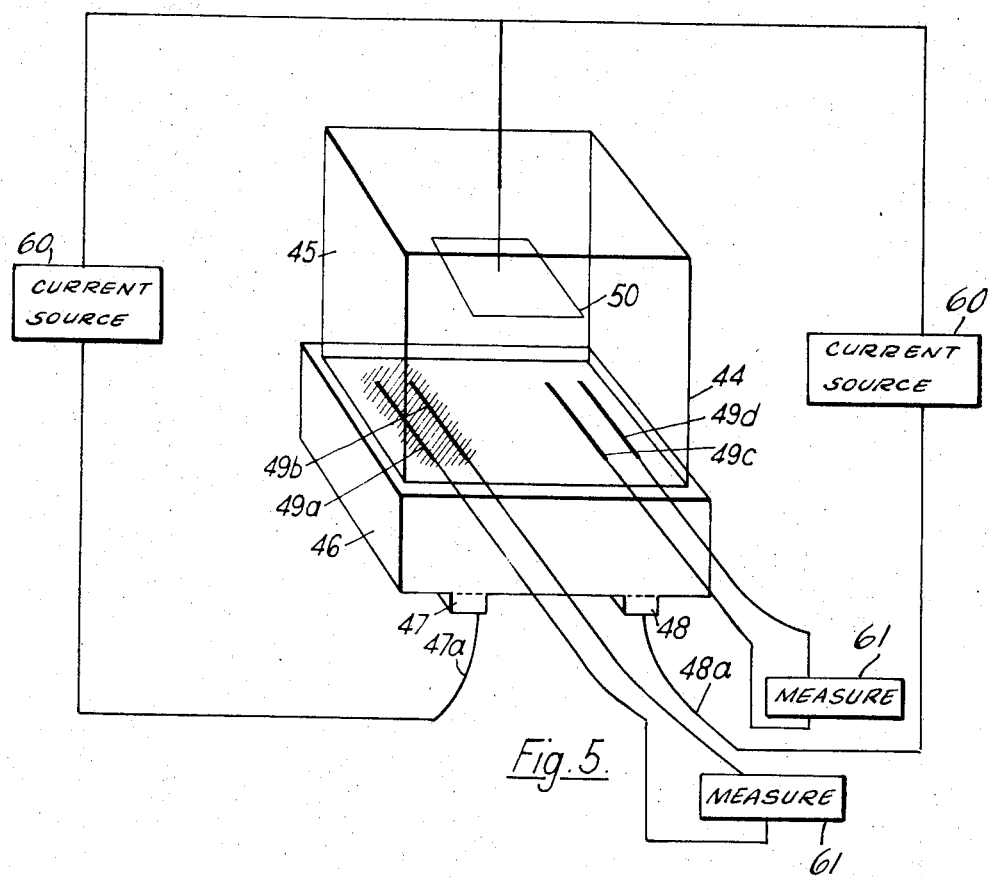

In order that the invention may be more clearly understood several examples thereof, together with an example of a circuit suitable for use with one embodiment, are described below with reference to the drawings accompanying the provisional specification, in which:

FIG. 1 is a schematic of a simple digital to analogue conversion and data storage unit; and FIG. 2 is a schematic of a modified form of the unit shown in FIG. 1; and FIG. 3 is a schematic of a circuit utilising the unit illustrated in FIG. 2; and FIG. 4 is a schematic of a multiple compensating digital to analogue conversion and storage unit; and FIG. 5 is a schematic of an alternative digital to analogue conversion and storage unit utilising electrolytic deposition; and FIG. 6 is a schematic of a second alternative unit utilizing anodic oxide formation.

The unit shown in FIG. 1 consists of two interconnected vessels 1 and 2 joined by a connecting tube 3. The vessel 1 is filled with a liquid electrolyte 4 and two electrodes 5 and 6 are positioned in the electrolyte 4 and are connected to input circuits including current source 60 by their respective leads 5a and 6a. The electrolyte 4 also occupies a portion of the connecting tube 3, the adjacent portion of which contains a quantity of electrically conducting liquid 7 having a high specific electrical resistivity. The liquid 7 and the electrolyte 4 are in electrical contact at the interface 8, both liquids being chosen so as to have chemical properties which will sustain such an interface without intermixing of the liquids. The vessel 2 is filled with an inert gas 9. An electrode 10 is positioned in the high resistivity liquid 7 and is connected to the lead 10a.

Upon the passage of an electric current between the electrodes 5 and 6 an electrochemical reaction takes place within the electrolyte 4. If the electrolyte 4 consists of a weak acid, such as dilute sulphuric acid, the result of the electrochemical reaction is the liberation of quantities of hydrogen and oxygen gas, which rise and form a gas pocket 11 in the vessel 1. The amount of gas formed is proportional to the current between the electrodes 5 and 6, and the electrochemical reaction ceases upon the removal of the current from the electrodes. The formation of the gas pocket 11 causes a gas pressure in the vessel 1 which tends to drive the electrolyte 4 out of the vessel 1 and into the connecting tube 3. This in turn pushes the liquid 7 along the connecting tube 3 and tends to compress the inert gas 9 in the vessel 2. Such movements cease when the electrochemical reaction ceases and the pressure of the gas pocket 11 and the inert gas 9 achieve a balance.

Further passage of a current between the electrodes 5 and 6 causes further movement of the liquid 7 towards the vessel 2. Thus the extent of the electrochemical reaction at any given time is proportional to the amount of current passed between the electrodes 5 and 6 and can be determined by locating the position of the interface 8 in the connecting tube 3. This is achieved by measuring the electrical resistance between the electrodes 5 and 10 by the measuring means 61. The resistance between these electrodes is made up in part by the resistance of the electrolyte 4 between the electrode 5 and the interface 8, and in part by the resistance of the liquid between the interface 8 and the electrode 10. As the interface 8 is moved towards the vessel 2, the electrolyte resistance will increase and the liquid resistance will decrease. However, since the electrolyte 4 has a low resistance and the liquid 7 has a high resistance, the overall resistance between the electrodes 5 and 10 will decrease as the interface 8 moves towards the vessel 2.

Therefore the amount of current passed between the electrodes 5 and 6 can be determined by measuring the electrical resistance between the electrodes 5 and 10. If the input current is in digital form the output can be expressed in analogue values and the device shown in FIG. 1 is thus a digital to analogue conversion unit. Since the electrochemical reaction in the electrolyte 4 causes a gas pocket 11 which remains after the reaction ceases, the analogue values can be determined at a time later than that of the input currents. Thus the device also serves as an analogue store. The device can also be actuated by currents representing analogue values as well as digital values. It is in effect therefore a device capable of receiving and adding both digital and analogue information, storing the result and delivering the stored information in terms of analogue values.

In the modified unit shown in FIG. 2 there are separate pairs of input and output electrodes. The vessels 12 and 13 are connected by the tube 14 which is provided with a constriction 15. The high resistivity liquid 16 is located between the electrolyte 17 and a further quantity of low resistance liquid 18 which is also confined to the tube 14. The vessel 13, as in the previous embodiment, is filled with an inert gas 19. Input electrodes 20 and 21 are located in the electrolyte 17, and one output electrode 22 is located in the liquid 16. The second output electrode 23 is located in the low resistance liquid 18 in the tube 14.

In this embodiment the input electrodes function in the manner already described to generate a gas pocket 24 in the vessel 12. The stored information in this case is read out by measuring the overall resistance between the output electrodes 22 and 23, by the measuring means 61. Once again, this parameter depends on the position of a liquid interface between two electrodes, but in this case it is the interface 25 between the high resistivity liquid 16 and the low resistivity liquid 18. The constriction 15, being filled with high resistivity liquid 16, forms a very high impedance separating the input section of the device from the output section, yet allowing the moving of the liquid essential for the operation of the device. In this embodiment the low resistivity liquid 18 may be the same as the electrolyte, i.e. a weak acid.

A suitable electrolyte for the devices described above is any conducting liquid phase that produces a stable, gaseous product of electrolysis, the gas being effectively insoluble in both the electrolyte and the high resistivity liquid. A suitable high resistivity liquid for both devices is any conducting liquid, immiscible with the electrolyte, such that no gaseous products are produced when a current is passed via suitable electrodes, through the high resistivity liquid. For example, any aqueous solution of a mineral acid meets the first requirement, and an iodine solution in chloroform of any strength meets the second requirement. A typical electrolyte solution is 0.1 N $H_2SO_4$ (decinormal sulphuric acid) in water and a typical high resistivity liquid is provided by a 0.1% solution of iodine in chloroform.

The unit illustrated in FIG. 2 may be utilised in a circuit such as that shown in FIG. 3. In this circuit digital values are received as input pulses at the point X, and the accumulated analogue output values are obtained at Y.

The circuit of FIG. 3 includes a pair of transistors T1 and T2 in the grounded emitter configuration. In this circuit the impedances $R_{20-21}$ and $R_{22-23}$ correspond to the impedances between the input electrodes 20 and 21 and the output electrodes 22 and 23 in FIG. 2.

An impulse applied at X to the base of transistor T1 turns off T1 and turns on transistor T2 which remains on until the capacitor C is re-charged through $R_{22-23}+R$. As a result of the charging and discharging of the capacitor a square wave output pulse occurs at point Y, corresponding to the application of an input signal to point X. The duration of this square wave output pulse is determined by the rate of recharge of the capacitor C. The rate of recharge of capacitor C is in turn dependent on the values of the components $(R+R_{22-23})C$. The square wave output discharged through $R_{20-21}$ causes electrolysis in the electrolytic cell, and thereby alters the value of $R_{22-23}$. Each succeeding input pulse received at X will therefore produce a square wave output pulse at Y the value of which reflects the cumulative value of the preceding input pulses.

Both the units shown in FIGS. 1 and 2 may be considered to be irreversible, that is to say that the magnitude of the analogue read-out can only be altered unidirectionally by successive applications of pulses at X. Since in this case the electrolysis of the electrolyte cannot be reversed, the devices can only record an increase or a decrease of the read-out values, in which every mode of operation is selected. The devices described with reference to FIGS. 1 and 2, which, as just mentioned are non-reversible in their action, have a number of practical applications. For example, such a device could be used as an adjunct to a production line where, after a certain number of operations, or after a certain operating time, a signal indicative of such a state is needed. A device such as shown in FIG. 1 or 2 could provide such a signal. In the first example each operation, e.g. the passage of a component past a monitoring point could produce a pulse of constant size, which, when applied to the electrodes 5, 6 or 20, 21 (FIG. 2) would generate a constant quantity of gas. Thus when the desired number of operations has been counted a quantity of gas appropriate thereto is generated, which shifts the interface to a known extent. Hence the resistance changes by a predetermined amount. In the second example a constant value current can be applied to the electrodes, or a constant value pulse applied at fixed intervals, to produce the predetermined change of resistance.

In both cases a control operation or an alarm signal is initiated when the above-mentioned resistance change has occurred. For repeated operations the device can be set to respond to several successive resistance changes of either the same or different values.

Another application of devices such as shown in FIG. 1 will indicate how such devices could be used as components of a so-called learning machine. Assume that the system is such that a signal from point A can be routed via devices such as in FIG. 1 to point B or point C, and that initially there is an even chance of a signal gain to B or to C. The A to B passage is the "satisfactory" condition. When such an A to B signal passage occurs, it produces a pulse through the central electrodes of the device between A and B, which increases the chance that the next pulse from A will reach B. Thus as pulses pass from A to B, the chance of a satisfactory result on a future pulse increases as the number of pulses already passed from A to B increases. Hence the arrangement, in effect, learns to route more and more pulses from A to B, and less to C.

The feature of irreversibility mentioned above should be distinguished from the feature that resetting is possible. For this purpose an escape valve in vessel 1, FIG. 1, would allow of letting the gas out to reset the device. At the same time the vessel 1 can be "topped up" as required to cater for the loss of liquid due to gas generation.

The limitations imposed by the use of irreversible devices such as those previously described can be overcome by combining two or more such devices to form a multiple compensating device such as that shown in FIG. 4.

The unit shown in FIG. 4 consists of three vessels 26, 27 and 28 connected by their respective connecting tubes 29, 30 and 31. The three connecting tubes have a common junction formed by a small vessel 32. Each of the vessels 26, 27 and 28 is filled with electrolyte 33 and the connecting tubes 29, 30 and 31 and the junction vessel 32 are filled with high resistivity liquid 34. The vessel 26 has two input electrodes 35 and 36, the vessel 27 has electrodes 37 and 38, and the vessel 28 has electrodes 39 and 40. A current source 60 is provided for each of the vessels 26, 27 and 28. The connecting tubes 29, 30 and 31 are provided respectively with electrodes 41, 42 and 43. In this arrangement the vessels 26, 27 and 28 produce pockets of gas under pressure when electrolysis takes place, and the liquid 34 will move between the three branches of the device until a state of equilibrium is reached between the three gas pressures involved. If now one vessel only is caused to produce further gas through the process of electrolysis, thereby driving the liquid 34 in the corresponding connecting tube towards the junction 32 it will drive the liquid 34 in the other two connecting tubes towards their respective vessels. Should it be required to reverse the effect in the first mentioned vessel, either or both of the other vessels may be utilised, by electrolysis therein, to drive the liquid 34 back towards the first mentioned vessel.

The arrangement shown in FIG. 4 is particularly suited for handling data from a plurality of sources, where the output information depends on modification of data from one source by that received from other sources. As an example, it often happens that output data is required which depends on the interaction between temperature and pressure, or other factors, all of which contribute to the desired result measuring means 61 is provided with each of the three vessels to determine the relative current flow.

Alternative forms of electrolytic cell which can be used for digital to analogue conversion and storage are those shown in FIGS. 5 and 6. FIG. 5 illustrates an electrolytic cell in which the electrochemical reaction utilised is electroplating. A thin plate 46 of p-type semiconductor material of high resistivity and with a carrier diffusion length of the same order as its thickness has tracks 47 and 48 of low resistivity n-type material formed integrally with it. A vessel 44 forms a seal over part of the face of the p-type material 46 remote from the n-type tracks 47 and 48. The vessel 44 contains a solution 45 of copper sulphate in water. Two pairs of parallel conducting metallic stripes 49a, 49b, 49c and 49d are located on the face of the semiconductor material 46 remote from the n-type tracks 47 and 48. Each pair of metallic stripes is positioned opposite one of the n-type tracks 47 and 48 and the stripes make ohmic contacts to the face of the p-type material 46. Lead connections 47a and 48a are attached to the n-type tracks 47 and 48, and each metallic stripe has an individual lead attached thereto. A copper anode 50 is positioned in the electrolyte above the metallic stripes 49a to d.

Data in the form of electric pulses is applied between either or both of the leads 47a and 48a and the anode 50, by the current sources 60. If a pulse is applied between lead 47a and 50 then electrons will be injected from the n-p junction between the n-type material 47 and the p-type material 46 and will travel diffusively through the p-type region without appreciable spreading and metallic copper will be deposited on the surface of the p-type material adjacent the metallic stripes 49a and 49b. Provided sufficient separation between each pair of metallic stripes is maintained the deposition of metallic copper in the region of one pair of stripes will have no effect on an adjacent pair of stripes. The data is now stored in the form of an electro-deposited film of copper which reduces the impedance between the stripes 49a and 49b and the data can be read out in analogue form by measuring the impedance between stripes 49a and 49b, by the measuring means 61.

FIG. 6 illustrates a simple cell 51 in which passage of electric currents between a pair of electrodes 52 and 53 causes formation of anodic oxide film on one of the electrodes. The formation of such an oxide film affects the capacitance between the electrodes and this in turn can be utilised as an indication of the quantity of current passed through the cell. Examples of the materials used in such a cell are pure aluminium plates for the electrodes 52 and 53 and an electrolyte of ammonium borate solution. The current source and measuring means 62 provides the current for forming the oxide film and for measuring the amount of current flow.

It is to be understood that the systems are not to be restricted to the particular geometry described. It will be obvious that the vessels and connecting tubes in FIGS. 1, 2, and 4 may be replaced by suitable tracks and cavities etched in the surface of a sheet of ceramic, the tracks then being "sealed" by placing and sealing thereon a plane sheet of glass or ceramic with electrodes in appropriate positions on the inner surface of this sheet, and with leads to these electrodes brought through the sheet.

What we claim is:

1. Apparatus for digital to analogue conversion comprising a vessel containing an electrolyte, an anode, a slice of semiconductor material which seals said vessel, one or more electrodes situated within the electrolyte, and one or more semiconductor material electrodes being formed on the outer face of the semiconductor material, and electrodes formed on the inner surface of said semiconductor slice, means for passing incremental quantities of electric current from the anode through the electrolyte and to the semiconductor material, electrolytic deposition of an electrically conducting material occuring on part of the inner surface of the semiconductor material in contact with the electrolyte, and measuring means wherein the resistivity of the electrolytic deposition on the inner surface of said slice may be measured, the result of said measurement being an analogue representation of the current applied to the device.

2. Apparatus according to claim 1 in which the semiconductor slice material is p-type material of high resistivity and has a carrier diffusion length of the same order as the thickness of the material.

3. Apparatus according to claim 1 in which the electrolyte is a solution of copper sulphate in water.

4. Apparatus for digital to analogue conversion comprising an electrolytic cell, as hereinbefore defined, having two electrodes, current source and measuring means connected to the electrodes so electric current may be passed through the cell to cause the formation of an anodic oxide film on one of the electrodes, and to measure the capacitance between the electrodes.

5. Apparatus according to claim 4 in which the electrodes are aluminium plates and the electrolyte is a solution of ammonium borate.

6. An electrolytic cell arrangement, which comprises a vessel which contains an electrolyte, an electrode inside said vessel and immersed in said electrolyte, a p-type slice of a semiconductor material which seals said vessel and has its inner surface in contact with the electrolyte, a pair of electrodes formed on the inner surface of said semiconductor slice and a n-type semiconductor electrode on the outer surface of said slice, means for passing an electrical current between the electrode immersed in said electrolyte and the electrode on the outer surface of said slice to produce an electrochemical reaction in the course of which reaction products are deposited on the slice over the electrodes on said inner surface, the electrical resistance between those electrodes being thus dependent on the current which has flowed in said electrolyte.

7. An arrangement as claimed in claim 6, in which said slice has two or more electrode pairs on its inner surface and two or more electrodes on its outer surface, each electrode on the outer surface being aligned with a pair of electrodes on the inner surface, and in which depositions due to current between an electrode on the outer surface and said immersed electrode causes current deposition over the inner surface electrodes aligned with that outer surface electrode.

8. An electrolytic cell arrangement, which comprises first, second and third sealed vessels each of which is connected via a narrow bore tube to a common vessel, so as to produce a generally Y-shaped structure, a liquid electrolyte which generates a gas when current passes therethrough in said first, second and third vessels, which electrolyte extends into each of the three narrow-bore tubes, a further liquid which fills said common vessel and the portions of the narrow bore tubes not containing electrolyte, which further liquid is substantially immiscible with the electrolytes in said first, second and third vessels and is also electrically conductive, having a high specific electrical resistivity, an electrode located in each said narrow-bore tube in the portion thereof which contains said further liquid, and pairs of electrodes in each of said first, second and third vessels, the arrangement being such that electrical current applied between the electrodes in one of said first, second and third vessels causes a gas-generating electro-chemical reaction therein, the gas so produced driving the electrolyte into the tube between that vessel and the common vessel, and measuring means so arranged that measurement of the electrical resistance between the electrode in a connecting tube and its electrolyte containing vessel gives a measure of the current which has flowed between the two electrodes in that vessel.

9. An arrangement as claimed in claim 8, and in which each said connecting tube has a constriction adjacent to said common vessel.

References Cited
UNITED STATES PATENTS

| | | | |
|---|---|---|---|
| 1,005,671 | 10/1911 | Thorpe | 324—94 |
| 2,910,648 | 10/1959 | Keller | 324—94 |
| 3,054,031 | 9/1962 | Estes et al. | 324—94 X |

ARCHIE R. BORCHELT, *Primary Examiner.*

WALTER L. CARLSON, *Examiner.*

G. L. LETT, E. F. KARLSEN, *Assistant Examiners.*